(12) United States Patent
Cha et al.

(10) Patent No.: US 11,540,222 B2
(45) Date of Patent: *Dec. 27, 2022

(54) APPARATUS AND METHOD FOR CONTROLLING OPERATION CYCLE OF ELECTRONIC DEVICE IN WIRELESS COMMUNICATION SYSTEM

(71) Applicant: Samsung Electronics Co., Ltd., Gyeonggi-do (KR)

(72) Inventors: Ji Young Cha, Gyeonggi-do (KR); Hye Jeong Kim, Gyeonggi-do (KR); Jung Hoon Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 14 days.

This patent is subject to a terminal disclaimer.

(21) Appl. No.: 17/170,997

(22) Filed: Feb. 9, 2021

(65) Prior Publication Data

US 2021/0168724 A1 Jun. 3, 2021

Related U.S. Application Data

(60) Continuation of application No. 16/868,022, filed on May 6, 2020, now Pat. No. 10,925,003, which is a
(Continued)

(30) Foreign Application Priority Data

Sep. 26, 2017 (KR) .......................... 10-2017-0124196

(51) Int. Cl.
*H04W 52/02* (2009.01)
*H04W 4/20* (2018.01)

(52) U.S. Cl.
CPC ......... *H04W 52/0261* (2013.01); *H04W 4/20* (2013.01)

(58) Field of Classification Search
CPC ..... H04W 64/00; H04W 88/02; H04W 76/28; H04W 28/06; H04W 24/02; H04W 24/10;
(Continued)

(56) References Cited

U.S. PATENT DOCUMENTS 8,190,169 B2 5/2012 Shim
8,248,923 B2 8/2012 Czaja et al.
(Continued)

FOREIGN PATENT DOCUMENTS

EP 2 487 944 A2 8/2012
KR 10-1608151 B1 4/2016
(Continued)

*Primary Examiner* — Quan M Hua
(74) *Attorney, Agent, or Firm* — Cha & Reiter, LLC

(57) ABSTRACT

An electronic device is provided. The electronic device includes a first communication circuit, a second communication circuit, a processor configured to be electrically connected with the first communication circuit and the second communication circuit, and a memory configured to be electrically connected with the processor. The memory includes instructions, when executed by the processor, cause the processor to obtain location information of the electronic device, transmit a first message for requesting to change a state of the electronic device to a network, receive a first response message to the transmitted first message from the network, transmit a second message for requesting a parameter for an operation cycle of the second communication circuit to the network, receive a second response message to the second message from the network, and change the operation cycle of the second communication circuit to a value corresponding to a current state of the electronic device.

8 Claims, 10 Drawing Sheets

Related U.S. Application Data continuation of application No. 16/687,883, filed on Nov. 19, 2019, now Pat. No. 10,660,041, which is a division of application No. 16/133,851, filed on Sep. 18, 2018, now Pat. No. 10,492,146.

(58) Field of Classification Search
CPC ....... H04W 4/185; H04W 4/21; H04W 48/04; H04W 64/003; H04W 76/20; H04W 76/27; H04W 88/08; H04W 12/08; H04W 4/021; H04W 4/023; H04W 4/02; H04W 4/029; H04W 52/02; H04W 52/0216; H04W 28/0215; H04W 52/0235; H04W 4/00; H04W 24/00; H04W 4/20; H04W 4/80; H04L 67/18; H04L 51/20; H04M 1/72457

See application file for complete search history.

(56) References Cited

U.S. PATENT DOCUMENTS

| | | |
|---|---|---|
| 8,521,182 B2 | 8/2013 | Shim |
| 8,811,984 B2 | 8/2014 | Cho et al. |
| 8,929,917 B2 | 1/2015 | Shim |
| 9,338,761 B2 | 5/2016 | Ur |
| 9,451,653 B2 | 9/2016 | Davies et al. |
| 9,769,311 B2 | 9/2017 | Ur |
| 10,003,687 B2 | 6/2018 | Ur |
| 10,139,892 B2 | 11/2018 | Hardin et al. |
| 10,171,942 B2 | 1/2019 | Park et al. |
| 10,492,146 B2 * | 11/2019 | Cha .................. H04W 52/0261 |
| 10,660,041 B2 | 5/2020 | Cha et al. |
| 2006/0120320 A1 | 6/2006 | Shim |
| 2009/0092078 A1 | 4/2009 | Czaja et al. |
| 2010/0220597 A1 * | 9/2010 | Ji ........................ H04W 16/10 370/336 |
| 2011/0051642 A1 | 3/2011 | Krishnaswamy |
| 2012/0106423 A1 | 5/2012 | Nylander et al. |
| 2012/0196599 A1 | 8/2012 | Cho et al. |
| 2012/0231812 A1 | 9/2012 | Shim |
| 2013/0304839 A1 | 11/2013 | Shim |
| 2014/0161007 A1 * | 6/2014 | Donthi .............. H04W 52/0216 370/311 |
| 2014/0370909 A1 * | 12/2014 | Natucci, Jr. ....... H04W 52/0251 455/574 |
| 2015/0245312 A1 | 8/2015 | Ur |
| 2016/0044742 A1 * | 2/2016 | Davies .............. H04W 72/0413 370/311 |
| 2016/0192141 A1 | 6/2016 | Park et al. |
| 2016/0219144 A1 | 7/2016 | Ur |
| 2017/0249007 A1 | 8/2017 | Hardin et al. |
| 2018/0007195 A1 | 1/2018 | Ur |
| 2018/0234540 A1 | 8/2018 | Ur |
| 2019/0113964 A1 | 4/2019 | Hardin et al. |

FOREIGN PATENT DOCUMENTS

| | | | |
|---|---|---|---|
| KR | 10-1693948 B1 | 1/2017 | |
| WO | 2006/062318 A1 | 6/2006 | |
| WO | WO-2012041075 A1 * | 4/2012 | ........... H04L 5/0007 |
| WO | 2016/148752 A1 | 9/2016 | |

* cited by examiner

APPARATUS AND METHOD FOR CONTROLLING OPERATION CYCLE OF ELECTRONIC DEVICE IN WIRELESS COMMUNICATION SYSTEM

CROSS-REFERENCE TO RELATED APPLICATION(S)

This application is a Continuation of U.S. Ser. No. 16/868,022 filed on May 6, 2020 which is a Continuation of U.S. patent application Ser. No. 16/687,883 filed on Nov. 19, 2019, assigned U.S. Pat. No. 10,660,041, issued on May 19, 2020, which is a Divisional of the earlier U.S. patent application Ser. No. 16/133,851 filed on Sep. 18, 2018 and assigned U.S. Pat. No. 10,492,146, issued on Nov. 26, 2019, which claims priority under 35 U.S.C. § 119 to Korean Patent Application No. 10-2017-0124196, filed on Sep. 26, 2017, in the Korean Intellectual Property Office, the disclosure of which is incorporated by reference herein its entirety.

BACKGROUND

1. Field

The present disclosure generally relates to an apparatus and method for controlling an operation cycle of an electronic device in a wireless communication system.

2. Description of Related Art

The Internet has evolved into an Internet of things (IoT) network where distributed components such as things transmit, receive, and process information. The IoT network can be also conceptualized as a human-centered network on which humans generate and consume information. In an IoT environment, an intelligence Internet technology (IT) service of collecting and analyzing data generated from connected things and creating new value for the human users may be provided. The IoT is applicable to various environments, such as smart homes, smart buildings, smart cities, smart or connected cars, smart grids, healthcare, smart appliances, and cutting-edge medical services, through convergence and integration between IoT, conventional IT, and various industries.

In general, an electronic device (e.g., an IoT terminal) which supports an IoT environment may need to reduce power consumption, reduce terminal costs, and ensure wide, stable coverage. Technologies for meeting the above-mentioned needs may be referred to as low power wide-area (LPWA). For example, an electronic device which supports LPWA may periodically repeat a power-saving operation where its communication circuit (e.g., a communication processor (CP)) is activated and deactivated.

The above information is presented as background information only to assist with an understanding of the present disclosure. No determination has been made, and no assertion is made, as to whether any of the above might be applicable as prior art with regard to the present disclosure.

SUMMARY

An electronic device which supports the IoT may provide functions for reducing power consumption. However, the functions for reducing power consumption may fail to be adaptively applied depending on the current state of the electronic device. The current state of the electronic device may include, for example, a state where the electronic device needs to measure its location more frequently or a state where the battery power remaining in the electronic device is insufficient.

Aspects of the present disclosure are to address at least the above-mentioned problems and/or disadvantages and to provide at least the advantages described below. Accordingly, an aspect of the present disclosure is to provide an apparatus for controlling an operation cycle of an electronic device depending on a current state of the electronic device and a method thereof.

In accordance with an aspect of the present disclosure, an electronic device is provided. The electronic device may include a first communication circuit, a second communication circuit, a processor configured to be electrically connected with the first communication circuit and the second communication circuit, and a memory configured to be electrically connected with the processor. The memory may include instructions, when executed by the processor, cause the processor to obtain location information of the electronic device via the first communication circuit, transmit, based on the obtained location information, a first message for requesting to change a state of the electronic device to a network via the second communication circuit, receive a first response message to the transmitted first message from the network, transmit a second message for requesting a parameter for an operation cycle of the second communication circuit to the network via the second communication circuit in response to the first response message, receive a second response message to the second message from the network, and change the operation cycle of the second communication circuit to a value corresponding to a current state of the electronic device in response to the second response message.

In accordance with another aspect of the present disclosure, an electronic device is provided. The electronic device may include a first communication circuit, a second communication circuit, a processor configured to be electrically connected with the first communication circuit and the second communication circuit, and a memory configured to be electrically connected with the processor. The memory may include instructions, when executed by the processor, cause the processor to obtain location information of the electronic device via the first communication circuit, determine, based on the obtained location information, that the electronic device changes from a first state to a second state, when the electronic device is in the second state, determine, based on at least one of movement speed information of the electronic device or remaining battery power information of the electronic device, that the electronic device is in one of a third state and a fourth state included in the second state, transmit a first message for requesting to change a state of the electronic device to a network via the second communication circuit, receive a first response message to the transmitted first message from the network, transmit a second message for requesting a parameter for an operation cycle of the second communication circuit toward the network via the second communication circuit in response to the first response message, receive a second response message to the second message from the network, and change the operation cycle of the second communication circuit to a value corresponding to a current state of the electronic device in response to the second response message.

In accordance with another aspect of the present disclosure, a server device is provided. The server device may include a communication circuit and a processor. The processor may be configured to execute stored instructions to receive a first message for requesting to change a state of an electronic device from another server device, transmit a response message to the first message to the other server device, receive a second message for requesting a parameter for an operation cycle of the electronic device from the electronic device, determine a parameter for the operation cycle in response to the second message, and transmit a second response message including the determined parameter to the electronic device.

According to embodiments disclosed in the present disclosure, an electronic device may save power consumption by controlling an operation cycle of the electronic device depending on a current state of the electronic device.

According to embodiments disclosed in the present disclosure, a user of another electronic device may receive various services based on a current state of an electronic device by controlling an operation cycle of the electronic device.

In addition, various other aspects and advantages may be directly or indirectly ascertained through the present disclosure.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the present disclosure may be described with reference to accompanying drawings. Accordingly, those of ordinary skill in the art will recognize that various modifications, equivalents, and/or alternatives on the various embodiments described herein can be made without departing from the scope and spirit of the present disclosure.

Figure 1:
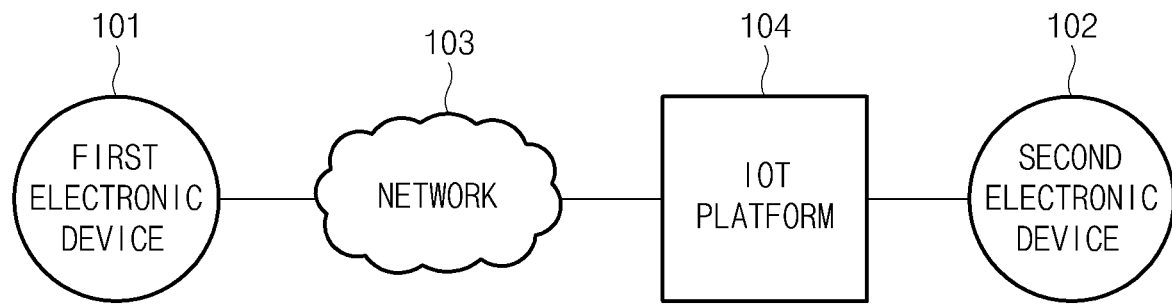
FIG. 1 is a block diagram illustrating a network environment for supporting the Internet of things (IoT) according to an embodiment.

FIG. 1 is a block diagram illustrating a network environment for supporting the Internet of things (IoT) according to an embodiment.

Referring to FIG. 1, each of the components may be one entity and may be a set of a plurality of entities. In the example shown in FIG. 1, a second electronic device 102 directly connected with an IoT platform 104. However, the embodiments are not limited thereto. For example, the second electronic device 102 and the IoT platform 104 may communication with each other through a wired/wireless network same or similar to the network 103.

According to an embodiment, each of the electronic device 101 and the second electronic device 102 may be referred to as a device used by a user. Each of the electronic device 101 and the second electronic device 102 may also be referred to as a terminal, user equipment (UE), a mobile station, a subscriber station, a remote terminal, a wireless terminal, a user device, or another term having equivalent technical meaning.

According to an embodiment, the network 103 may include one or more entities which communicate with the first electronic device 101 over a wired/wireless channel. The network 103 may include an IoT network. For example, the network 103 may include at least one of a base station (e.g., an access point (AP), an eNodeB (eNB), a $5^{th}$ generation (5G) node, a wireless point, a transmission/reception point (TRP), a 5G NodeB (5GNB), or another equivalent device), a mobility management entity (MME), a gateway (GW), a home subscriber server (HSS), and a service capability exposure function (SCEF).

According to an embodiment, the IoT platform 104 may provide an IoT service to the first electronic device 101 and the second electronic device 102 over the network 103 (or another network connected with the second electronic device 102). The IoT platform 104 may be referred to as an application server (AS), a machine type communication (MTC) server, or a machine to machine (M2M) server.

According to an embodiment, the first electronic device 101 may support the IoT network. For example, the first electronic device 101 may communicate with the network 103 over a pre-determined frequency band. The pre-determined frequency band may be a portion of a frequency band (hereinafter referred to as "in-band") used in another cellular system (e.g., long term evolution (LTE), universal mobile telecommunication system (UMTS), global system for mobile communications (GSM), etc.), may include a guard band used in the other cellular system, or may be a dedicated frequency band (hereinafter referred to as "standalone") used in the other cellular system. In another example, the first electronic device 101 may communicate with the network 103 over a pre-determined bandwidth. The pre-determined bandwidth may be, for example, 20 MHz, 1.4 MHz, or 180 KHz.

According to an embodiment, the first electronic device 101 may transmit location information, movement speed information, and/or remaining battery power information of the first electronic device 101 periodically or in response to a request of another entity (e.g., the base station included in the network 103, the IoT platform 104, or the second electronic device 102). The IoT platform 104 may store the location information, the movement speed information, and/or the remaining battery power information of the first electronic device 101 or may transmit the location information, the movement speed information, and/or the remaining battery power information of the first electronic device 101 to the second electronic device 102.

According to an embodiment, the first electronic device 101 may transmit, to the network 103, a message for requesting a parameter for an operation cycle of the first electronic device 101. In various embodiments disclosed in the present disclosure, the operation cycle of the first electronic device 101 may refer to an operation cycle where at least some operations of a communication circuit (e.g., a communication processor (CP)) included in the first electronic device 101 are deactivated. In various embodiments disclosed in the present disclosure, the parameter for the operation cycle may include at least one of, for example, an operation cycle where the communication circuit included in the first electronic device 101 is activated and deactivated, a time period when the first electronic device 101 monitors a location signal request signal, a timer value at which the first electronic device 101 operates in an idle mode, or a timer value at which the first electronic device 101 operates in a power saving mode (PSM). The first electronic device 101 may control the frequency in which location information of the first electronic device 101 is transmitted or may reduce battery consumption of the first electronic device 101 by adjusting the parameters for the operation cycle. The message for requesting the parameter for the operation cycle may include the parameter values that are required (i.e., generated) by the first electronic device 101. The network 103 may accept parameters required by the first electronic device 101 without change and may assign the accepted parameters to the first electronic device 101, or may re-assign a new value different from the parameter values required by the first electronic device 101.

Figure 2:
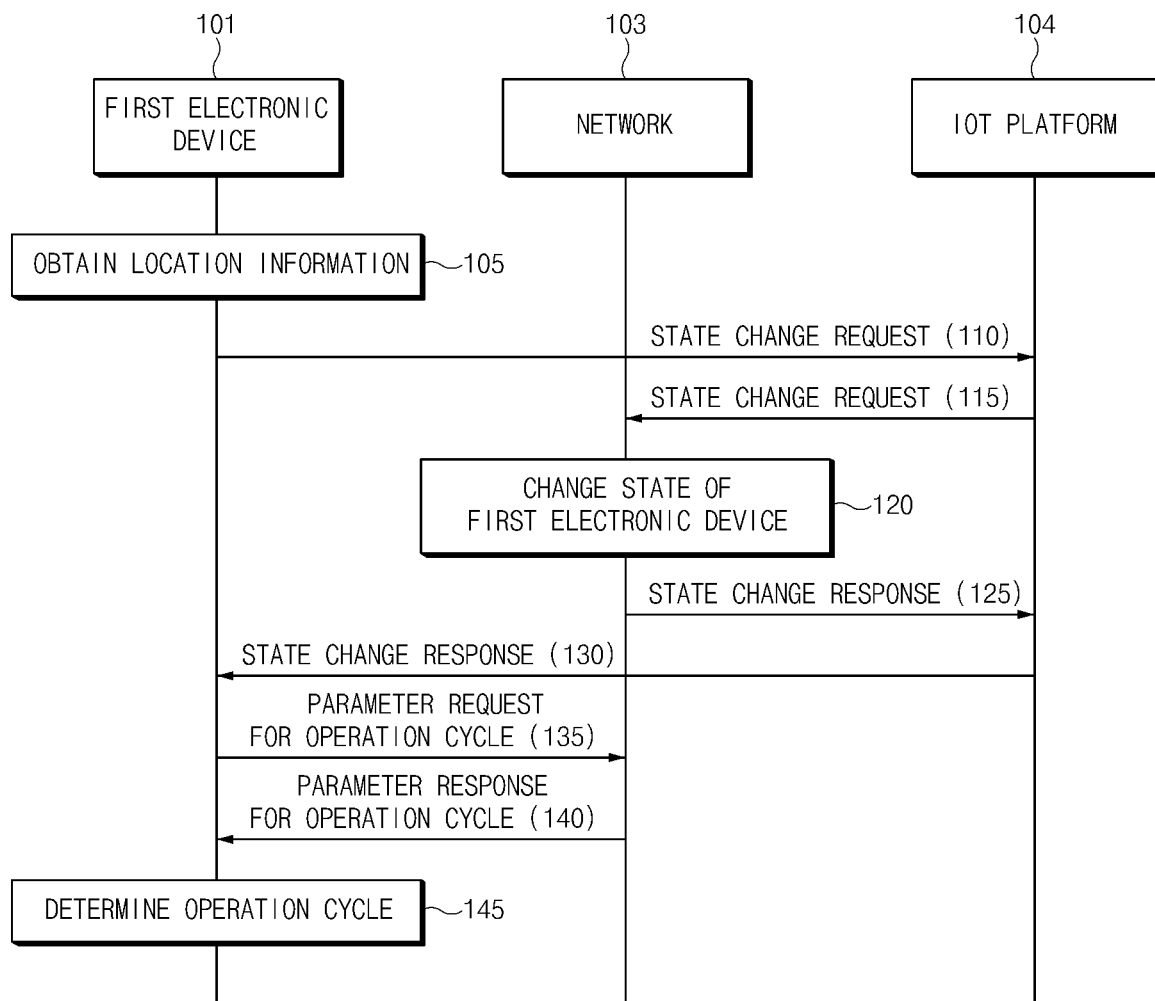
FIG. 2 is a signal sequence diagram illustrating a process of changing an operation cycle of an electronic device according to an embodiment.

FIG. 2 is a signal sequence diagram illustrating a process of changing an operation cycle of an electronic device according to an embodiment.

Referring to FIG. 2, in operation 105, the first electronic device 101 may obtain its location information. According to an embodiment, the first electronic device 101 may obtain its location information using a positioning system such as global positioning system (GPS), wireless-fidelity (Wi-Fi) positioning system (WPS), or cellular positioning system (CPS). The location information may include, for example, coordinates indicating a location of the first electronic device 101 or a movement path of the first electronic device 101.

According to an embodiment, in operation 110, based on the obtained location information, the first electronic device 101 may transmit a message (hereinafter referred as "first message") for requesting to change a state of the first electronic device 101 to an IoT platform 104. According to an embodiment, the state of the first electronic device 101 may be determined based on location information of the first electronic device 101. For example, in a state (hereinafter referred to as "second state") where the first electronic device 101 departs from a pre-specified area or a pre-specified movement path, the first electronic device 101 may need to adjust the frequency in which location information is transmitted or change an operation cycle of the first electronic device 101 (e.g., an operation cycle of a communication circuit included in the first electronic device 101) to save battery consumption. But in a state (hereinafter referred to as "first state") where the first electronic device 101 does not depart from the pre-specified area or the pre-specified movement path, the first electronic device 101 may not need to change the operation cycle of the first electronic device 101. When the first electronic device 101 needs to change its current state from the first state to the second state (or from the second state to the first state), it may transmit the first message to the IoT platform 104.

According to an embodiment, the first electronic device 101 may generate the first message through an application layer. An application (e.g., a location tracker application) for periodically verifying the location of the first electronic device 101 may be executed in the first electronic device 101 and the second electronic device 102. When the first electronic device 101 needs to change from the first state to the second state, the application may generate the first message for requesting to change the state of the first electronic device 101.

According to an embodiment, in operation 115, in response to receiving the first message, the IoT platform 104 may transmit the message for requesting to change the state of the first electronic device 101 to the network 103. According to an embodiment, the IoT platform 104 may transmit the message for requesting to change the state of the first electronic device 101 to an entity of the network 103 through the application layer. For example, an application executed in the IoT platform 104 (e.g., an application which provides a service for periodically verifying the location of the first electronic device 101) may generate the message for requesting to change the state of the first electronic device 101 in response to receiving the first message. The message transmitted from the IoT platform 104 may be transmitted to, for example, an MME through a GW included in the network 103.

According to an embodiment, in operation 120, the network 103 (e.g., the MME) may change the state of the first electronic device 101 and may store information about the changed state of the first electronic device 101. In operation 125, the network 103 may transmit a state change response message to the IoT platform 104. For example, the MME included in the network 103 may transmit the state change response message through the GW. The state change response message may include, for example, information about the changed state of the first electronic device 101 and/or may include information (e.g., flag data) indicating a response to the request to change the state of the first electronic device 101.

According to an embodiment, in operation 130, the IoT platform 104 may transmit a response message (hereinafter referred to as "first response message") to the first message to the first electronic device 101. For example, the first response message may include information about the changed state of the first electronic device 101 and/or may include information (e.g., flag data) indicating a response to the request to change the state of the first electronic device 101. Although not illustrated in FIG. 1, the IoT platform 104 may store information about the changed state of the first electronic device 101 in its memory or may notify the second electronic device 102 about the changed state of the first electronic device 101. According to an embodiment, the messages transmitted and received in operations 110 to 130 may be generated in the application layer of each of entities.

According to an embodiment, in operation 135, the first electronic device 101 may transmit a message (hereinafter referred to as "second message") for requesting a parameter for an operation cycle of the first electronic device 101 to the network 103. The first electronic device 101 may transmit the second message to the network 103 over a pre-determined frequency band. According to an embodiment, the second message may be an attach request message, a tracking area update (TAU) request message, or a routing area update (RAU) request message. The second message may include parameters required by the first electronic device 101 (i.e., parameters generated by the first electronic device 101).

According to an embodiment, in operation 140, the network 103 may transmit a response message (hereinafter referred to as "second response message") to the second message to the first electronic device 101. According to an embodiment, the second response message may be an attach response message, a TAU response message, or an RAU response message. When the current state of the first electronic device 101 is the first state, the network 103 may accept parameters included in the second message without change and assign the parameters to the first electronic device 101 or may assign a new value different from the parameter values included in the second message. When the current state of the first electronic device 101 is the second state, the network 103 may accept the parameters included in the second message without re-assigning the parameters and may assign the parameters to the first electronic device 101. Thus, when the state of the first electronic device 101 changes to the second state, the second response message include parameters having the same value as the parameters included in the second message. In addition, the second response message may include data (e.g., flag data) indicating that the parameters included in the second message are accepted without change.

According to an embodiment, in operation 145, the first electronic device 101 may determine its operation cycle based on the received second response message. For example, when in the first state, the first electronic device 101 may operate its communication circuit in an operation cycle to which parameter values assigned from the network 103 are applied. In another example, when in the second state, the first electronic device 101 may operate the communication circuit in an operation cycle to which parameter values required by the first electronic device 101 are applied.

Accordingly, the first electronic device 101 may adaptively adjust its operation cycle depending on its current state by triggering a request to change the state of the first electronic device 101 based on its location information. For example, when a user of the first electronic device 101 is a child and when a user of the second electronic device 102 is the father or mother of the child, the father or mother may need to periodically verify the location of the child. When the child loses his or her way (i.e., when the first electronic device 101 departs from a pre-specified area or a pre-specified movement path so that the first electronic device 101 is in the second state), the first electronic device 101 may request the network 103 to transmit parameters of an operation cycle to prolong battery life. In addition, the first electronic device 101 may request the network 103 to transmit parameters for setting the location information transmission cycle to a shorter cycle.

In the example shown in FIG. 2, the first electronic device 101 changes its operation cycle based on the location information. However, the state of the first electronic device 101 may be determined based on other criteria such as movement speed information or remaining battery power information. For example, when a movement speed of the first electronic device 101 is greater than or equal to a threshold, the first electronic device 101 may need to transmit its location information more frequently. In another example, when the remaining battery power of the first electronic device 101 is less than a threshold, the first electronic device 101 may need to save battery consumption. The first electronic device 101 may set its operation cycle to a longer or shorter cycle based on its movement speed information or its remaining battery power information.

Figure 3:
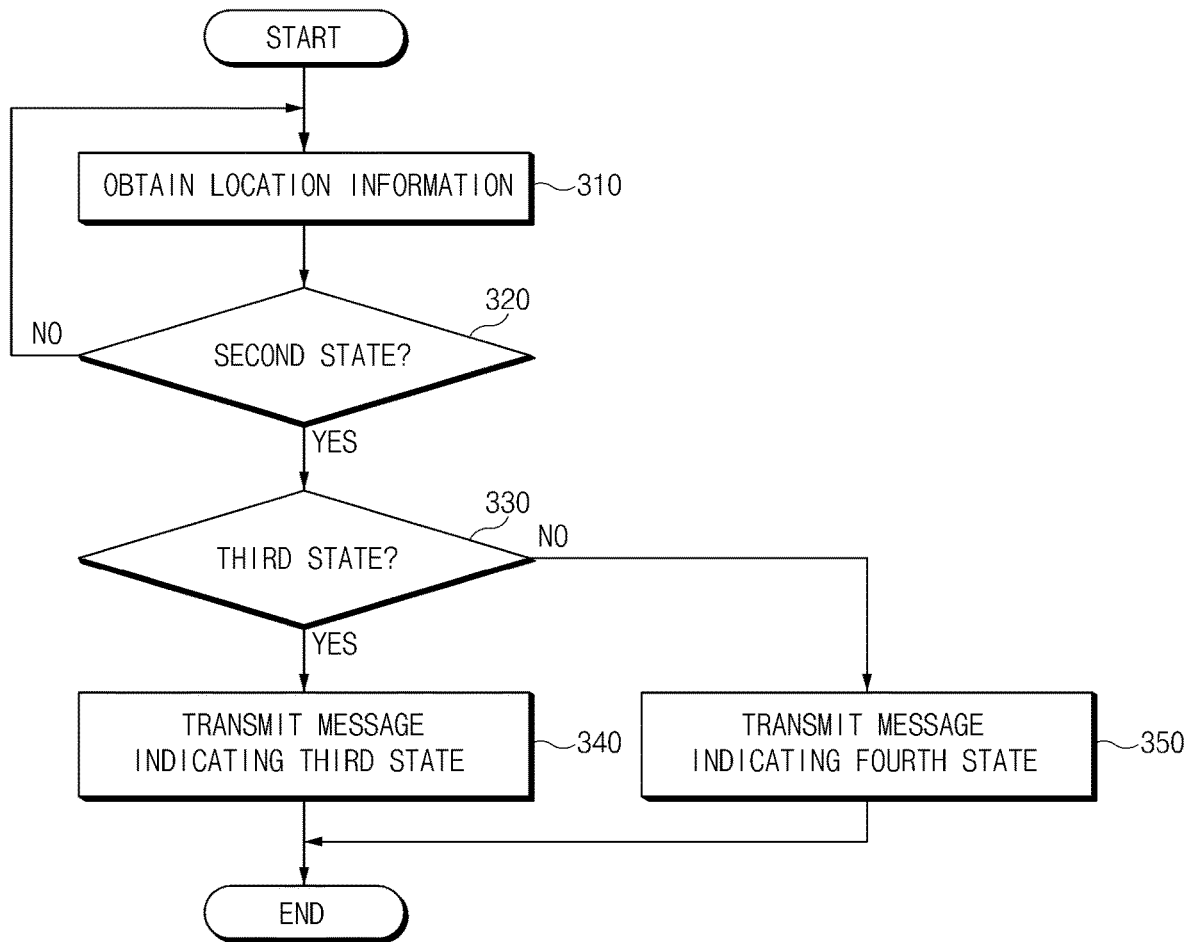
FIG. 3 is a flowchart illustrating an operation of an electronic device for changing a state of the electronic device according to an embodiment.

FIG. 3 is a flowchart illustrating an operation of an electronic device for changing a state of the electronic device according to an embodiment. Operations shown in FIG. 3 may be implemented by a processor (e.g., an application processor (AP)) included in an electronic device 101 of FIG. 1 or a processor executing an application installed in the first electronic device 101 (e.g., an application which supports an IoT service).

Referring to FIG. 3, in operation 310, the first electronic device 101 according to an embodiment may obtain its location information. The first electronic device 101 may obtain the location information using a positioning system or a sensor.

In operation 320, the first electronic device 101 according to an embodiment may determine, based on the obtained location information, whether to be in a state (the second state) where the first electronic device 101 needs to change its operation cycle. If the first electronic device 101 determines that it is in the first state where it does not need to change its operation cycle, the first electronic device 101 may repeatedly perform operations 310 and 320.

According to an embodiment, the first electronic device 101 may determine its state based on pre-specified area information or pre-specified movement path information. The pre-specified area information may include one or more geo-fences. The geo-fence may be set by, for example, a user of the first electronic device 101 or a second electronic device 102. The movement path information may be generated as location information of the first electronic device 101 is accumulated or may be set by the user of the first electronic device 101 or the second electronic device 102. Thus, when the measured location of the first electronic device 101 departs from the geo-fence or the movement path, the first electronic device 101 may determine that it is in the second state. In the embodiment with multiple geo-fences, when the currently measured location of the first electronic device 101 is out of all the plurality of geo-fences, the first electronic device 101 may determine that it is in the second state.

In operation 330, the first electronic device 101 according to an embodiment may determine whether to be in a third or fourth state, based on at least one of its movement speed information or its remaining battery power information. In various embodiments disclosed in the present disclosure, the third state may refer to a state where the first electronic device 101 needs to prioritize saving its battery consumption as compared with tracking its location. For example, the third state may mean that there is no motion of the first electronic device 101, that a movement speed of the first electronic device 101 is less than a threshold, or that remaining battery capacity of the first electronic device 101 is less than a threshold. In various embodiments disclosed in the present disclosure, the fourth state may refer to a state where the first electronic device 101 needs to prioritize tracking its location as compared with saving its battery consumption. For example, the fourth state may mean that a movement speed of the first electronic device 101 is greater than or equal to the threshold or that remaining battery capacity of the first electronic device 101 is greater than or equal to the threshold.

According to an embodiment, the first electronic device 101 may obtain its motion or its movement speed information using a sensor (e.g., a gyro sensor or an acceleration sensor) included in the first electronic device 101. According to another embodiment, the first electronic device 101 may obtain the motion or the movement speed information using a positioning system. For example, the first electronic device 101 may measure its motion or its movement speed based on the difference in distance between a location measured at a specific time point (e.g., time point a) and a location measured at another specific time point (e.g., time point b) and the difference in time between time point a and time point b.

According to an embodiment, when the first electronic device 101 determines its state based on both of its movement speed information and its remaining battery power information, it may determine its state based on which of the movement speed information and the remaining battery power information takes priority. For example, it may be assumed that the remaining battery power information is prioritized over the movement speed information. In this case, although the movement speed of the first electronic device 101 is greater than or equal to a threshold, when remaining battery capacity of the first electronic device 101 is less than a threshold, the first electronic device 101 may determine its current state as the third state.

According to an embodiment, when the first electronic device 101 is in the third state, a message (e.g. the first message described above) for requesting to change a state of the first electronic device 101 may include information indicating the third state. This message may then be transmitted at operation 340. When the first electronic device 101 is in the fourth state, the first message may include information indicating the fourth state. This message may then be transmitted at operation 350.

Figure 4:
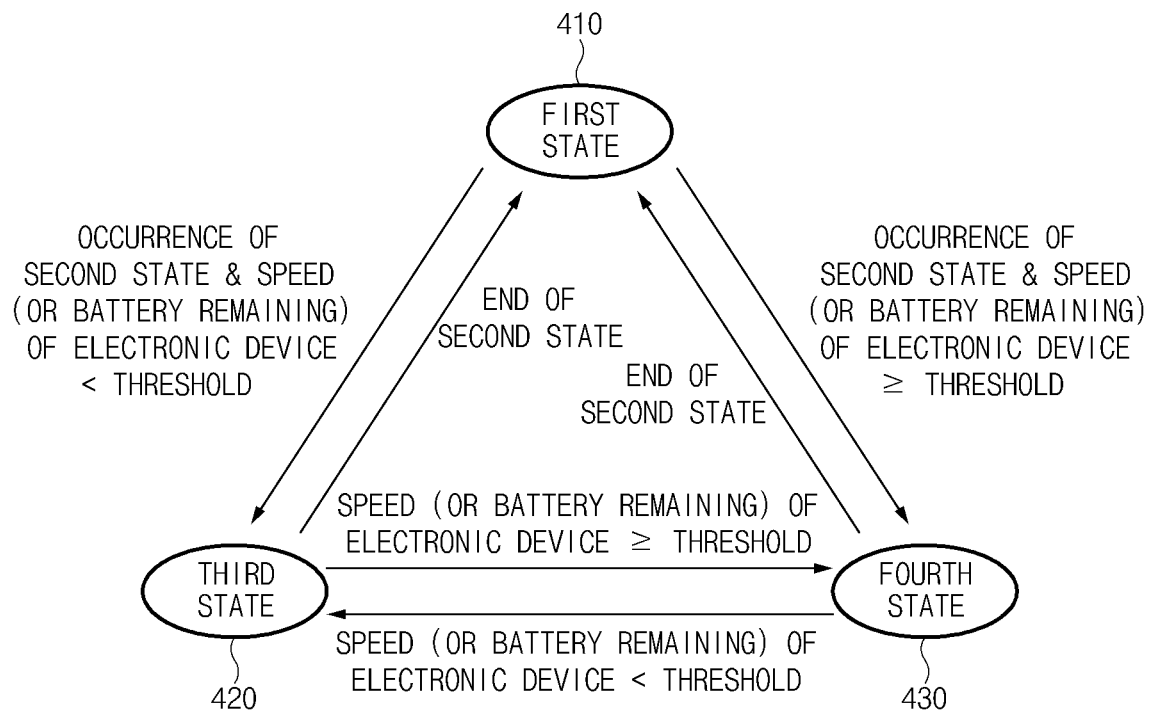
FIG. 4 is a state diagram illustrating a relationship between the various states of an electronic device according to an embodiment.

FIG. 4 is a state diagram illustrating a relationship between the various states of an electronic device according to an embodiment.

Referring to FIG. 4, the first state 410 may refer to a state where a first electronic device 101 of FIG. 1 is within a pre-specified area (e.g., one or more geo-fences) or within a pre-specified movement path. After departing from the pre-specified area or the pre-specified movement path, the first electronic device 101 may change to a second state. In the second state, when the movement speed or remaining battery power of the first electronic device 101 is less than a threshold, the first electronic device 101 may change to the third state 420. In the second state, when the movement speed or the remaining battery power of the first electronic device 101 is greater than or equal to the threshold, the first electronic device 101 may change to the fourth state 430. As the movement speed or the battery remaining changes, the electronic device 101 may switch between the third state 420 and the fourth state 430. In third state 420 or the fourth state 430, when the first electronic device 101 returns to the pre-specified area or the pre-specified movement path, the first electronic device 101 may change back to the first state 410.

Figure 5:
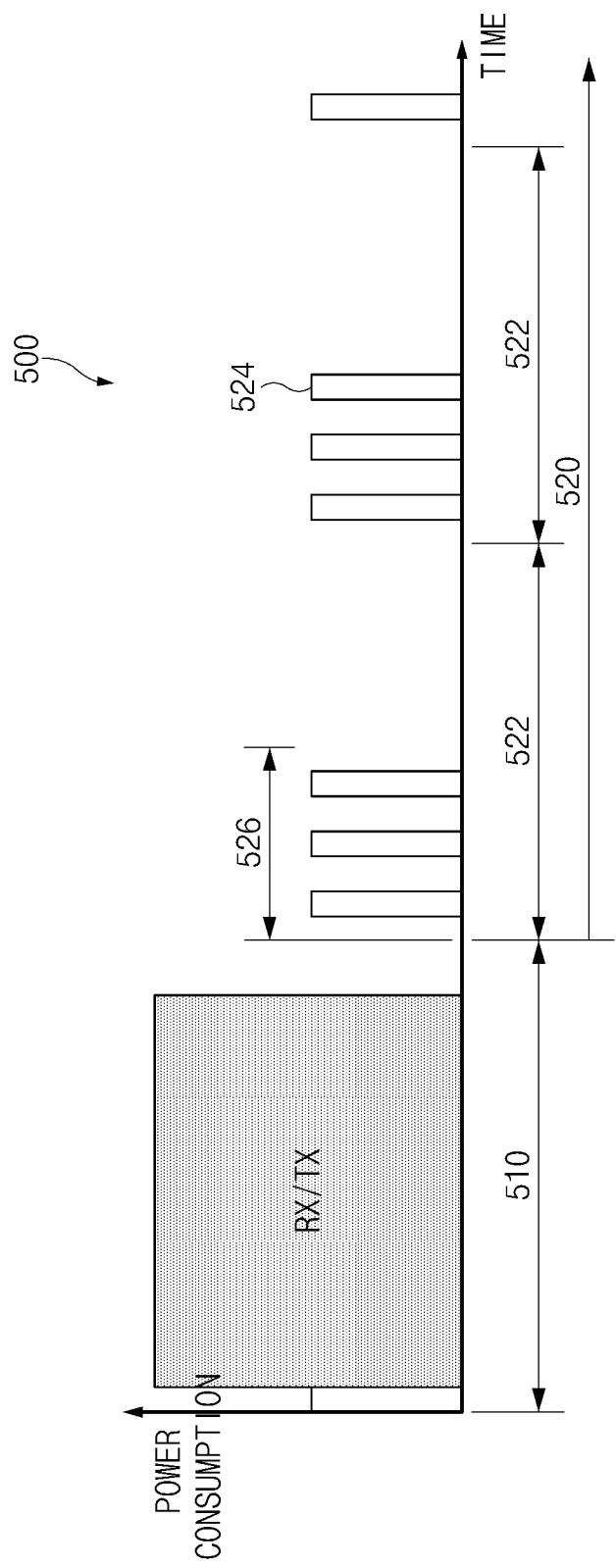
FIG. 5 is a diagram illustrating an operation cycle of an electronic device according to an embodiment.

FIG. 5 is a diagram illustrating an operation cycle of an electronic device according to an embodiment.

The first electronic device 101 of FIG. 1, which supports an IoT network, may operate in two operation modes for more efficient battery management. In various embodiments disclosed in the present disclosure, the first operation mode among the two operation modes may be referred to as a connected mode (e.g., radio resource control (RRC)-connected, evolved packet service (EPS) mobility management (EMM)-registered, or EPS connection management (ECM)-connected). According to an embodiment, in the first operation mode, the first electronic device 101 may establish a logical connection with the network 103 (e.g., a base station of the network 103) of FIG. 1. For example, in case of RRC-connected, the first electronic device 101 may maintain an RRC-connected state with the base station and the base station may verify the location of the first electronic device 101 for each cell.

In various embodiments disclosed in the present disclosure, a second operation mode among the two operation modes may be referred to as a sleep mode or an idle mode (e.g., RRC-idle, EMM-idle, or ECM-idle). According to an embodiment, in the second operation mode, the first electronic device 101 may deactivate operations of at least some portions of a communication circuit (e.g., a communication processor (CP)) configured to communicate with the network 103 or the second electronic device 102. According to an embodiment, at least some of functions of an application processor (AP) of the first electronic device 101 may also be limited in the second operation mode. For example, in the second operation mode, the AP may not process signals transmitted and received with the second electronic device 102, but it may measure location or motion of the first electronic device 101 or may check the remaining battery power of the first electronic device 101. According to an embodiment, in the second operation mode, the first electronic device 101 may be managed in a tracking area (TA) unit which has a wider area than a cell.

Referring to FIG. 5, the horizontal axis of graph 500 may indicate time, and the vertical axis of graph 500 may indicate power consumption of an electronic device. According to an embodiment, the first electronic device 101 in the first operation mode 510 may receive a location information request signal from the network 103 or the second electronic device 102. The first electronic device 101 may transmit information about tis measured location or movement speed to the network 103 or the second electronic device 102.

According to an embodiment, the first electronic device 101 in the second operation mode 520 may deactivate at least some operations of its communication circuit (e.g., a CP) using a specific operation cycle (e.g., an operation cycle 522). For example, after being powered on by a user, the first electronic device 101 may search for a cell of a base station included in the network 103 or may reselect a cell and may then change to the second operation mode 520. The operation cycle 522 may range from, seconds, hours, days, months, etc. In various embodiments disclosed in the present disclosure, the operation cycle 522 may be referred to as a discontinuous reception (DRX) cycle or an extended discontinuous reception (eDRX) cycle. The first electronic device 101 may perform a monitoring operation to receive a location information request signal (or a paging signal) from the network 103 or the second electronic device 102 at constant time intervals (e.g., a time interval 526) in the operation cycle 522. In various embodiments disclosed in the present disclosure, the time interval when the first electronic device 101 monitors the location information request signal may be referred to as a paging time window (PTW). The time interval when the first electronic device 101 monitors the information request signal may range from, seconds, hours, days, months, etc. The first electronic device 101 may receive the location information request signal (or the paging signal) at a specific time interval (e.g., time interval 524) in the operation cycle 522. In various embodiments disclosed in the present disclosure, the time interval when the first electronic device 101 receives the location information request signal may be referred to as a paging occasion (PO).

According to an embodiment, the first electronic device 101 may change the duration value of the operation cycle 522 or the duration value of the time interval 526 depending to its current state.

For example, when the first electronic device 101 is in the third state, it may set the operation cycle duration value to be larger than that determined in the first state. When the operation cycle duration value increases, the interval of the second operation mode 520 increases in length. And since the interval where the communication circuit of the first electronic device 101 is deactivated is lengthened, the first electronic device 101 may save battery consumption. In another example, when the first electronic device 101 is in the third state, it may set the time interval duration value to be smaller than that determined in the first state. When the time interval duration value decreases, the time interval when the communication circuit is activated to monitor the location information request signal decreases. As such, the first electronic device 101 may save power consumption. According to an embodiment, when the first electronic device 101 is in the fourth state, it may set the operation cycle duration value to be smaller than that in the first state. Similarly, in the fourth state, the time interval duration value may be set to be relatively larger.

Figure 6:
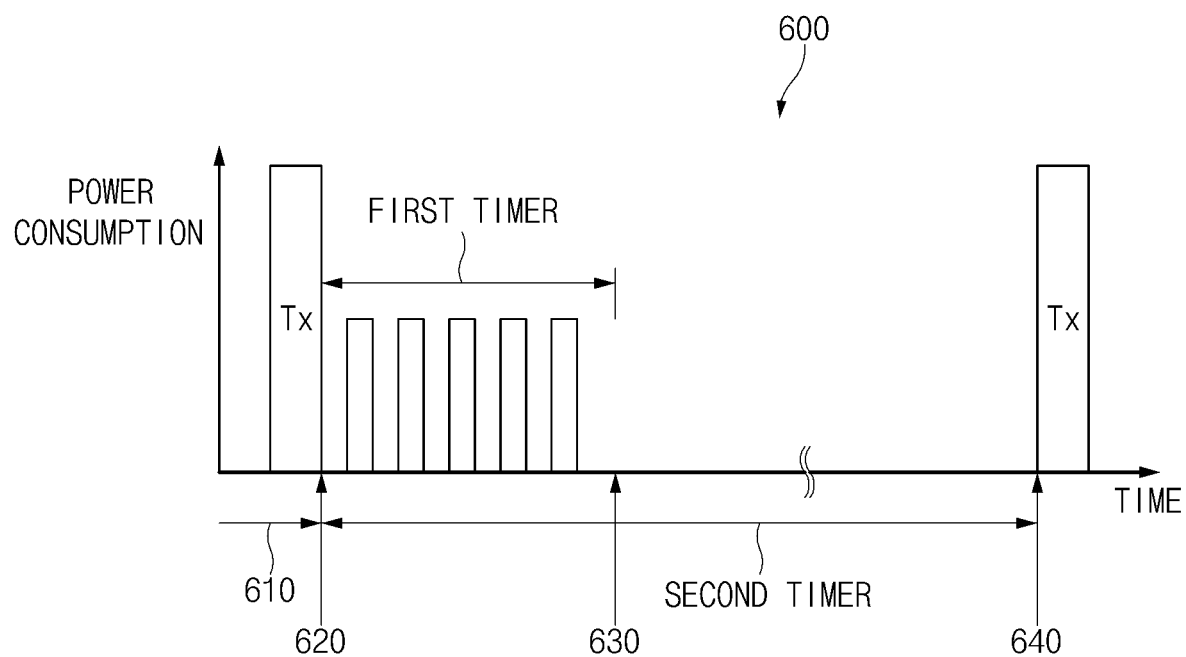
FIG. 6 is a diagram illustrating a relationship between a first operation mode, a second operation mode, and a third operation mode according to an embodiment.

FIG. 6 is a diagram illustrating a relationship between a first operation mode, a second operation mode, and a third operation mode according to various embodiments.

The first electronic device 101 of FIG. 1, which supports the second operation mode described above, may further support a third operation mode to save battery consumption more efficiently. In the third operation mode, the first electronic device 101 may not receive a location information request signal from the network 103 or the second electronic device 102 of FIG. 2. In various embodiments disclosed in the present disclosure, the third operation mode may be referred to as a power saving mode (PSM). According to an embodiment, an electronic device in the third operation mode may deactivate the functions of an access stratum. The access stratum may include a radio resource control (RRC) layer for managing a bearer (e.g., an RRC connection) between the electronic device and a base station, a medium access control (MAC) layer for managing uplink (or downlink) scheduling between the electronic device and the base station, and a radio link control (RLC) layer for adjusting a size of data transmitted through the bearer and managing quality of service (QoS) for each bearer.

Referring to FIG. 6, the horizontal axis of graph 600 may indicate time, whose unit may be second, minute, hour, etc., and the vertical axis of graph 600 may indicate power consumption of the first electronic device 101. The first electronic device 101 in the first operation mode 610 (e.g., the first operation mode 510 of FIG. 5) may change to the second operation mode (e.g., the second operation mode 520 of FIG. 5) at the first time point 620 and may simultaneously start a first timer and a second timer stored in the first electronic device 101. The first timer may be a timer used for the first electronic device 101 to change from the second operation mode 520 to a third operation mode 530. The first timer may be referred to as, for example, an active timer or T3324. In FIG. 6, the duration of the first timer may be shown as a difference between the second time point 630 and the first time point 620. The second timer may be a timer used for the first electronic device 101 to change from the third operation mode 530 to the first operation mode 510. The second timer may be referred to as, for example, an extended periodic TAU timer, T3412, or extended T3324. The duration of the second timer may be shown as a difference between the third time point 640 and the first time point 620.

According to an embodiment, the first electronic device 101 may change the duration of the first timer or the duration of the second timer depending on its current state. For example, when in the third state, the first electronic device 101 may set a second timer value (i.e. the duration of the second timer) to a value larger than that determined in the first state. The first electronic device 101 may also set a first timer value (i.e. the duration of the first timer) to a value smaller than that determined in the first state. When the second timer value increases or when the first timer value decreases, the operating interval of the third operation mode 530 increases in length. As such, the first electronic device 101 may save power consumption. Similarly, when in the fourth state, the first electronic device 101 may set the second timer value to a small value or may set the first timer value to a large value so that its location is more frequently measured.

Figure 7:
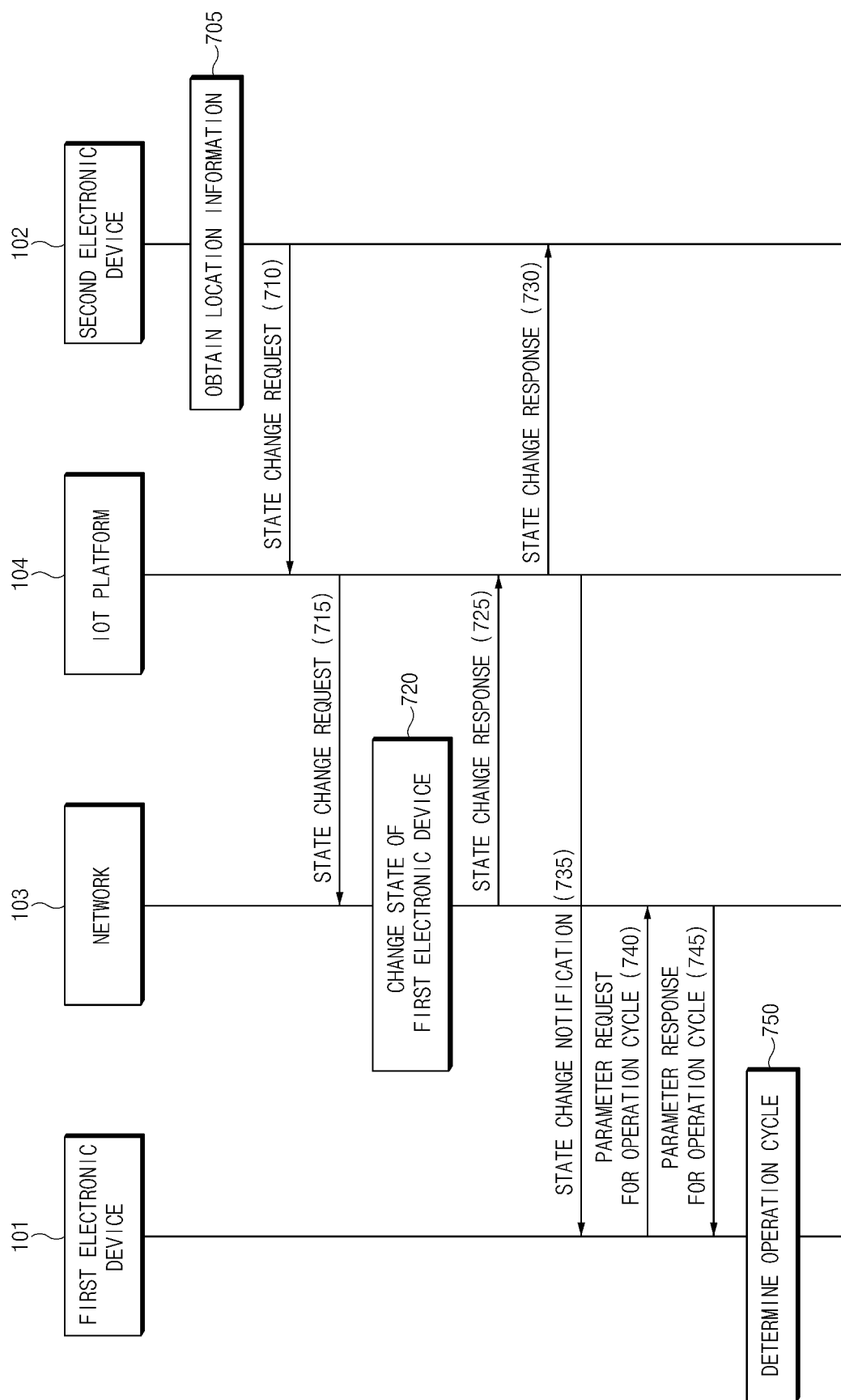
FIG. 7 is a signal sequence diagram illustrating a process of changing an operation cycle of an electronic device according to an embodiment.

FIG. 7 is a signal sequence diagram illustrating a process of changing an operation cycle of an electronic device according to an embodiment. FIG. 7 illustrates an embodiment in which a state change of a first electronic device 101 is triggered by a second electronic device 102.

Referring to FIG. 2, in operation 705, the second electronic device 102 according to an embodiment may obtain location information (e.g., location coordinates or a movement path) of the first electronic device 101 through an IoT platform 104. For example, the second electronic device 102 may obtain the location information by transmitting a location information request signal to the first electronic device 101 in response to a user request received by the second electronic device 102. For another example, the second electronic device 102 may periodically obtain the location information according to a pre-determined cycle.

In operation 710, based on the location information of the first electronic device 101, the second electronic device 102 according to an embodiment may transmit a message (hereinafter referred to as "third message") for requesting to change a state of the first electronic device 101 to the IoT platform 104. According to an embodiment, the third message may be generated by an application layer of the second electronic device 102 (e.g., a location tracker application executed in the second electronic device 102). The third message may be transmitted in response to that the state of the first electronic device 101 is changed or may be transmitted in response to a user input of the second electronic device 102.

In operation 715, the IoT platform 104 according to an embodiment may transmit the message for requesting to change the state of the first electronic device 101 to the network 103 in response to receiving the third message. According to an embodiment, the IoT platform 104 may transmit the message for requesting to change the state of the first electronic device 101 to an entity (e.g., an MME) of the network 103 through the application layer.

In operation 720, the network (e.g., the MME) according to an embodiment may change the state of the first electronic device 101 and may store information about the changed state of the first electronic device 101. In operation 725, the network 103 may transmit a state change response message to the IoT platform 104. For example, the MME included in the network 103 may transmit the state change response message through a GW. For example, the state change response message may include information about the changed state of the first electronic device 101 and/or may include information (e.g., flag data) indicating a response to the request to change the state of the first electronic device 101.

In operation 730, the IoT platform 104 according to an embodiment may transmit a response message to the third message (hereinafter referred to as "third response message" or "state change response message") to the second electronic device 102 in response to the message received from the network 103. For example, the state change response message may include the information about the changed state of the first electronic device 101 and/or may include information (e.g., flag data) indicating a response to the request to change the state of the first electronic device 101. In operation 735, the IoT platform 104 according to an embodiment may transmit a state change notification message indicating that the state is changed to the first electronic device 101. Hereinafter, operations 740 to 750 where a message is transmitted and received between the first electronic device 101 and the network 103 may be the same as operations 135 to 145 shown in FIG. 2.

The second electronic device 102 may more easily verify the location of the first electronic device 101 by monitoring location information of the first electronic device 101 and triggering the request to change the state of the first electronic device 101. For example, when the user of the first electronic device 101 is a child and when the user of the second electronic device 102 is the father or mother of the child, when the child who wears (or carries) the first electronic device 101 loses his or her way (i.e., when the first electronic device 101 departs from a pre-specified area or a pre-specified movement path or when the first electronic device 101 is in the second state), the father or mother may trigger the request to change the state of the first electronic device 101 such that the first electronic device 101 prolongs its battery life or may set the location information transmission cycle of the first electronic device 101 to a short cycle.

Figure 8:
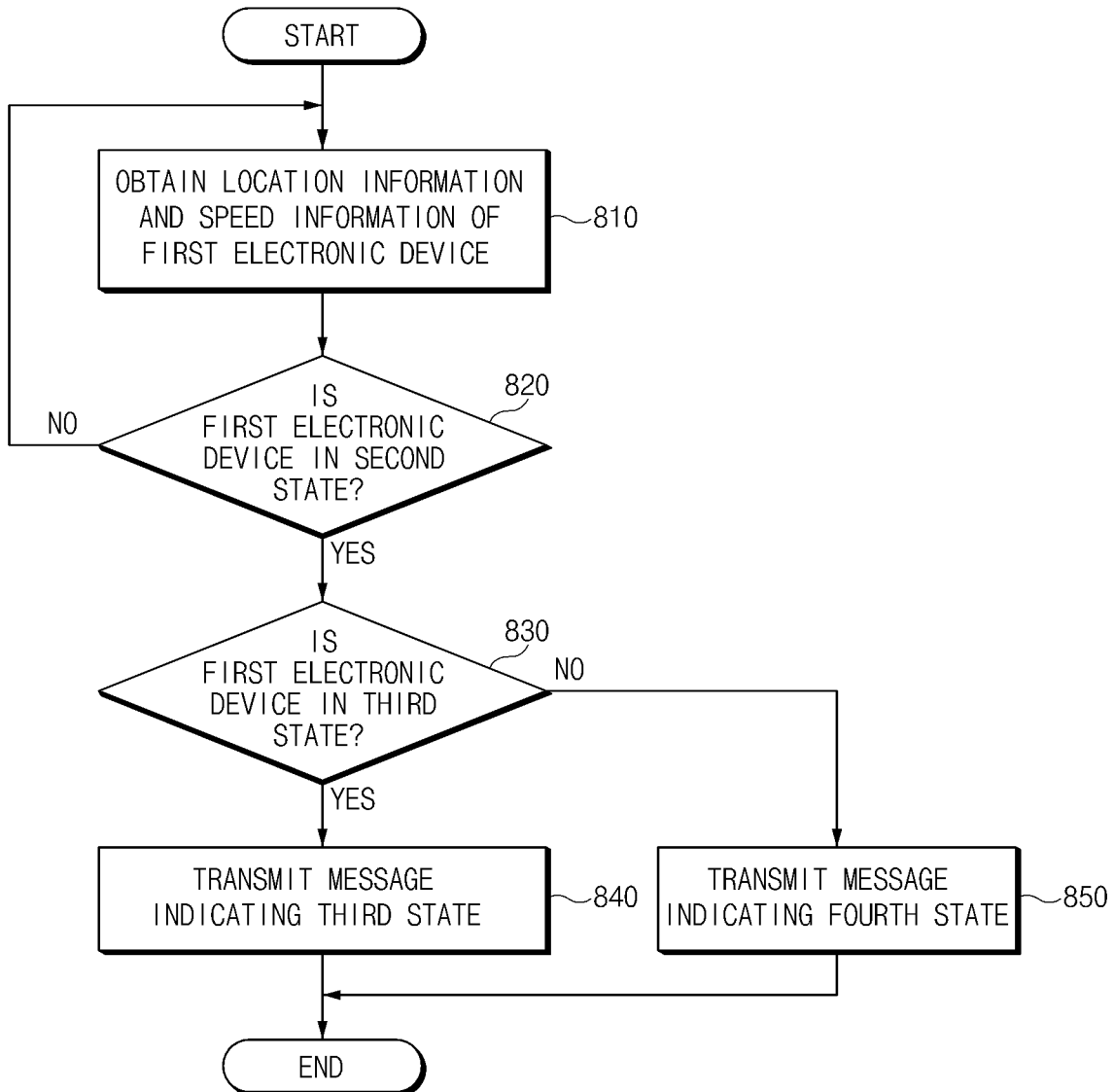
FIG. 8 is a flowchart illustrating an operation of an electronic device for changing a state of an electronic device according to an embodiment.

FIG. 8 is a flowchart illustrating an operation of an electronic device for changing a state of an electronic device according to an embodiment.

Referring to FIG. 8, in operations 810 and 820, the second electronic device 102 of FIG. 1 according to an embodiment, based on location information of the first electronic device 101, may determine whether the first electronic device 101 of FIG. 1 is in the second state where the first electronic device 101 needs to change its operation cycle. When the first electronic device 101 is in the first state where the first electronic device 101 does not need to change the operation cycle, the second electronic device 102 may repeatedly perform operations 810 and 820.

According to an embodiment, the second electronic device 102 may determine the state of the first electronic device 101 based on pre-specified area information or pre-specified movement path information. The pre-specified area information or the pre-specified movement path information may be stored in the IoT platform 104 of FIG. 1 or may be stored in a memory of the second electronic device 102. The pre-specified area information or the pre-specified movement path information may be set by a user of the second electronic device 102 or may be generated as location information of the first electronic device 101 is accumulated.

In operation 830, the second electronic device 102 according to an embodiment may determine whether the first electronic device 101 is in the third or fourth states, based on at least one of movement speed information or remaining battery power information of the first electronic device 101. For example, the second electronic device 102 may obtain the movement speed information or the remaining battery power information by transmitting an information request signal to the first electronic device 101 in response to a user request of the second electronic device 102. For another example, the second electronic device 102 may obtain the movement speed information or the remaining battery information periodically according to a pre-determined cycle. According to an embodiment, when determining the state based on both the movement speed information and the remaining battery power information of the first electronic device 101, the second electronic device 102 may determine the state based on which of the movement speed information and the remaining battery power information takes priority.

When the first electronic device 101 is in the third state, in operation 840, the second electronic device 102 may transmit a third message indicating the third state. When the first electronic device 101 is in the fourth state, in operation 850, the second electronic device 102 may transmit the third message indicting the fourth state.

As described above, the operation method of the first electronic device 101 may include obtaining location information of the first electronic device 101, transmitting, based on the obtained location information, a first message for changing a state of the first electronic device 101 to the network 103, receiving a first response message to the first message transmitted from the network 103, transmitting a second message for changing an operation cycle of a communication circuit included in the first electronic device 101 to the network 103 in response to the first response message, receiving a second response message to the second message from the network 103, and changing the operation cycle of the communication circuit to a value corresponding to a current state of the first electronic device 101 in response to the second response message. According to an embodiment, a parameter for the operation cycle may include at least one of a cycle where the communication circuit is activated and deactivated and a time period when the first electronic device 101 monitors a location information request signal.

According to an embodiment, the parameter for the operation cycle may further include at least one of a first timer value at which the first electronic device 101 operates in an idle mode and a second timer value at which the first electronic device 101 operates in a power saving mode (PSM).

According to an embodiment, the second message may include an attach request message, a TAU request message, or an RAU request message. The second response message may include an attach response message, a TAU response message, or an RAU response message.

According to an embodiment, the method of the first electronic device 101 may further include changing a current state of the first electronic device 101 from a first state to a second state based on at least one of the location information of the first electronic device 101 and information about a pre-specified area or information about a pre-specified movement path.

According to an embodiment, the method of the first electronic device 101 may further include changing a state of the first electronic device 101 from one of a third state and a fourth state based on at least one of movement speed information of the first electronic device 101 or remaining battery power information of the first electronic device 101.

According to an embodiment, the changing of the state of the first electronic device 101 to the one of the third state and the fourth state may include changing the state of the first electronic device 101 to the one of the third state and the fourth state based on which of movement speed information of the first electronic device 101 and remaining battery power information of the first electronic device 101 takes priority.

Figure 9:
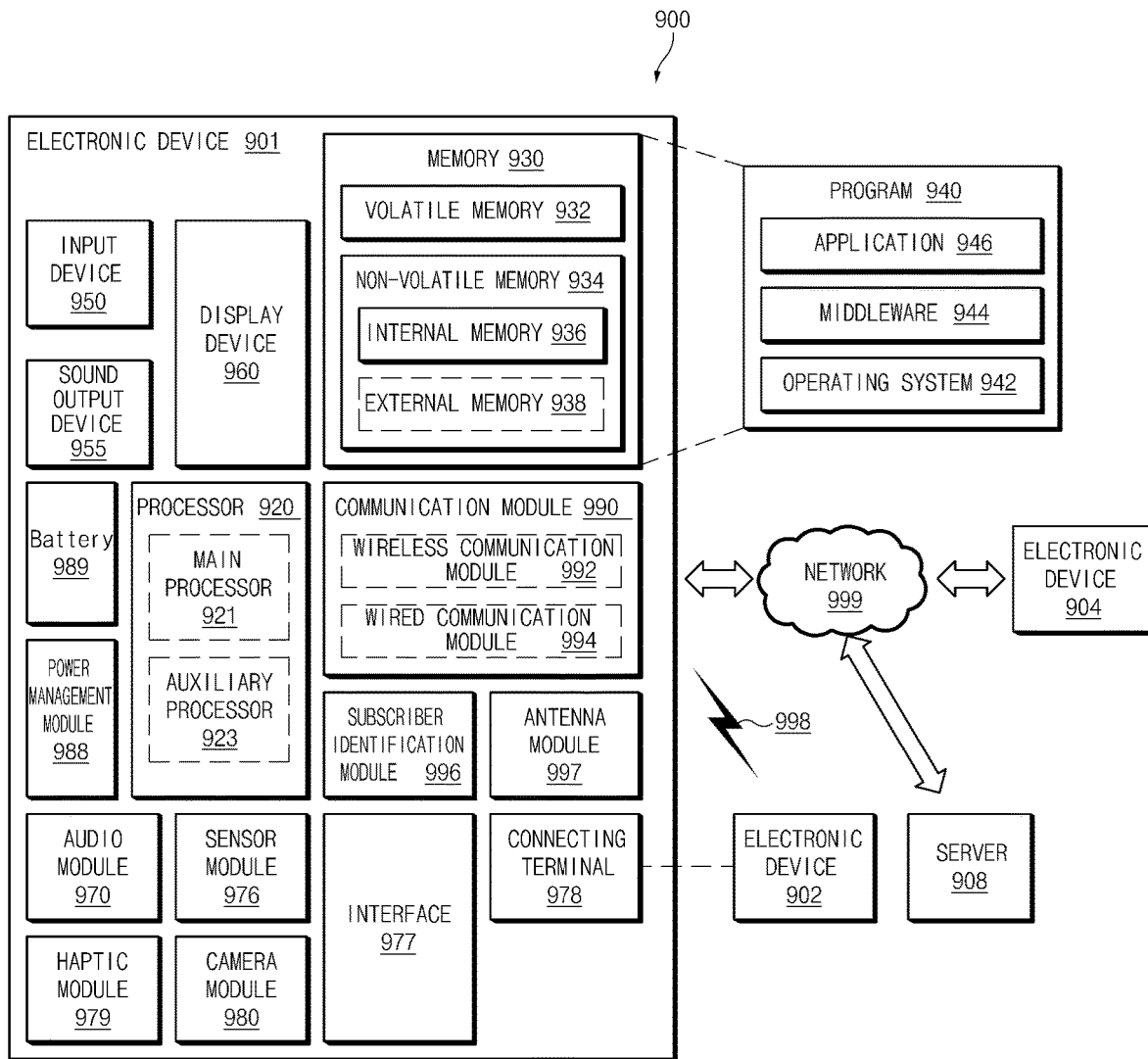
FIG. 9 is a block diagram illustrating a configuration of an electronic device according to an embodiment.

FIG. 9 is a block diagram illustrating a configuration of an electronic device according to an embodiment. FIG. 9 is a block diagram illustrating an electronic device 901 (e.g., a first electronic device 101 or a second electronic device 102 of FIG. 1) in a network environment 900 (e.g., a network environment of FIG. 1). When the electronic device 901 supports the IoT, to save costs and battery consumption of the electronic device 901, at least some of the components shown in FIG. 9 may be omitted.

Referring to FIG. 9, an electronic device 901 in the network environment 900 may communicate with an electronic device 902 through a first network 998 (e.g., a short-range wireless communication) or may communicate with an electronic device 904 (e.g., the second electronic device 102 or the first electronic device 101) or a server 908 (e.g., the IoT platform 104) through a second network 999 (e.g., a long-distance wireless communication same as the network 103) in a network environment 900. According to an embodiment, the electronic device 901 may communicate with the electronic device 904 through the server 908. According to an embodiment, the electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module 996, and an antenna module 997. According to some embodiments, at least one (e.g., the display device 960 or the camera module 980) among components of the electronic device 901 may be omitted or other components may be added to the electronic device 901. According to some embodiments, some components may be integrated and implemented as in the case of the sensor module 976 (e.g., a fingerprint sensor, an iris sensor, or an illuminance sensor) embedded in the display device 960 (e.g., a display).

The processor 920 may operate, for example, software (e.g., a program 940) to control at least one of other components (e.g., a hardware or software component) of the electronic device 901 connected to the processor 920 and may process and compute a variety of data. The processor 920 may load a command set or data, which is received from other components (e.g., the sensor module 976 or the communication module 990), into a volatile memory 932, may process the loaded command or data, and may store result data into a nonvolatile memory 934. According to an embodiment, the processor 920 may include a main processor 921 (e.g., a central processing unit or an application processor) and an auxiliary processor 923 (e.g., a graphic processing device, an image signal processor, a sensor hub processor, or a communication processor), which operates independently from the main processor 921, additionally or alternatively uses less power than the main processor 921, or is specified to a designated function. In this case, the auxiliary processor 923 may operate separately from the main processor 921 or embedded. The processor 920 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the auxiliary processor 923 (e.g., the sensor hub processor or the communication processor) may be implemented as a part of another component (e.g., the sensor module 976 or the communication module 990) that is functionally related to the auxiliary processor 923. The memory 930 may store a variety of data used by at least one component (e.g., the processor 920 or the sensor module 976) of the electronic device 901, for example, software (e.g., the program 940) and input data or output data with respect to commands associated with the software. The memory 930 may include the volatile memory 932 or the nonvolatile memory 934.

The program 940 may be stored in the memory 930 as software and may include, for example, an operating system 942, a middleware 944, or an application 946.

The input device 950 may be a device for receiving a command or data, which is used for a component (e.g., the processor 920) of the electronic device 901, from an outside (e.g., a user) of the electronic device 901 and may include, for example, a microphone, a mouse, or a keyboard.

The sound output device 955 may be a device for outputting a sound signal to the outside of the electronic device 901 and may include, for example, a speaker used for general purposes, such as multimedia play or recordings play, and a receiver used only for receiving calls. According to an embodiment, the receiver and the speaker may be either integrally or separately implemented.

The display device 960 may be a device for visually presenting information to the user and may include, for example, a display, a hologram device, or a projector and a control circuit for controlling a corresponding device. According to an embodiment, the display device 960 may include a touch circuitry or a pressure sensor for measuring an intensity of pressure on the touch.

The audio module 970 may convert a sound and an electrical signal in dual directions. According to an embodiment, the audio module 970 may obtain the sound through the input device 950 or may output the sound through an external electronic device (e.g., the electronic device 902 (e.g., a speaker or a headphone)) wired or wirelessly connected to the sound output device 955 or the electronic device 901.

The sensor module 976 may generate an electrical signal or a data value corresponding to an operating state (e.g., power or temperature) inside or an environmental state outside the electronic device 901. The sensor module 976 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 977 may support a designated protocol wired or wirelessly connected to the external electronic device (e.g., the electronic device 902). According to an embodiment, the interface 977 may include, for example, an HDMI (high-definition multimedia interface), a USB (universal serial bus) interface, an SD card interface, or an audio interface.

A connecting terminal 978 may include a connector that physically connects the electronic device 901 to the external electronic device (e.g., the electronic device 902), for example, an HDMI connector, a USB connector, an SD card connector, or an audio connector (e.g., a headphone connector).

The haptic module 979 may convert an electrical signal to a mechanical stimulation (e.g., vibration or movement) or an electrical stimulation perceived by the user through tactile or kinesthetic sensations. The haptic module 979 may include, for example, a motor, a piezoelectric element, or an electric stimulator.

The camera module 980 may shoot a still image or a video image. According to an embodiment, the camera module 980 may include, for example, at least one lens, an image sensor, an image signal processor, or a flash.

The power management module 988 may be a module for managing power supplied to the electronic device 901 and may serve as at least a part of a power management integrated circuit (PMIC).

The battery 989 may be a device for supplying power to at least one component of the electronic device 901 and may include, for example, a non-rechargeable (primary) battery, a rechargeable (secondary) battery, or a fuel cell.

The communication module 990 may establish a wired or wireless communication channel between the electronic device 901 and the external electronic device (e.g., the electronic device 902, the electronic device 904, or the server 908) and support communication execution through the established communication channel. The communication module 990 may include at least one communication processor operating independently from the processor 920 (e.g., the application processor) and supporting the wired communication or the wireless communication. According to an embodiment, the communication module 990 may include a wireless communication module 992 (e.g., a cellular communication module, a short-range wireless communication module, or a GNSS (global navigation satellite system) communication module) or a wired communication module 994 (e.g., an LAN (local area network) communication module or a power line communication module) and may communicate with the external electronic device using a corresponding communication module among them through the first network 998 (e.g., the short-range communication network such as a Bluetooth, a WiFi direct, or an IrDA (infrared data association)) or the second network 999 (e.g., the long-distance wireless communication network such as a cellular network, an internet, or a computer network (e.g., LAN or WAN)). The above-mentioned various communication modules 990 may be implemented into one chip or into separate chips, respectively.

According to an embodiment, the wireless communication module 992 may identify and authenticate the electronic device 901 using user information stored in the subscriber identification module 996 in the communication network.

The antenna module 997 may transmit a signal or power to the outside (e.g., an external electronic device) or may receive a signal or power from the outside. The antenna module 997 may be configured with a conductor or a conductive pattern according to an embodiment. In some embodiments, the antenna module 997 may further include another part (e.g., a radio frequency integrated circuit (RFIC)) other that the conductor or the conductive pattern. According to an embodiment, the antenna module 997 may include one or more antennas. At least one antenna suitable for a communication mode used in a communication network, such as the first network 998 or the second network 999, may be selected by, for example, the communication module 990. The signal or power may be transmitted or received between the communication module 990 and the external electronic device through the at least one selected antenna.

Some of the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 901 and the external electronic device 904 through the server 908 connected to the second network 999. Each of the electronic devices 902 and 904 may be the same or different types as or from the electronic device 901. According to an embodiment, all or some of the operations performed by the electronic device 901 may be performed by another electronic device or a plurality of external electronic devices. When the electronic device 901 performs some functions or services automatically or by request, the electronic device 901 may request the external electronic device to perform at least some of the functions related to the functions or services, in addition to or instead of performing the functions or services by itself. The external electronic device receiving the request may carry out the requested function or the additional function and transmit the result to the electronic device 901. The electronic device 901 may provide the requested functions or services based on the received result as is or after additionally processing the received result. To this end, for example, a cloud computing, distributed computing, or client-server computing technology may be used.

According to an embodiment, the processor 920 (e.g., the main processor 921) may obtain location information of the electronic device 901 (e.g., a first electronic device 101 of FIG. 1) via a communication circuit (hereinafter referred to as "first communication circuit") included in the wireless communication module 992. The first communication circuit may obtain the location information using a positioning system, for example, GPS, WPS, or CPS.

According to an embodiment, the processor 920 (e.g., the main processor 921) may transmit or receive a message (e.g., a first message, a first response message, a second message, or a second response message) with the second network 999 (e.g., a network 103 of FIG. 1) via another communication circuit (hereinafter referred to as "second communication circuit") included in the wireless communication module 992.

According to an embodiment, the processor 920 (e.g., the main processor 921) may obtain movement speed information of the electronic device 901 (e.g., the first electronic device 101) through a sensor included in the sensor module 976 or the auxiliary processor 923 (e.g., a sensor hub processor) or may obtain remaining battery power information through the power management module 988.

According to an embodiment, the auxiliary processor 923 or a communication processor (e.g., a second communication circuit) implemented as a portion of the communication module 990 may be activated or deactivated in accordance with an operation cycle (i.e., the communication processor may operate in one of first to third operation modes described above). When the communication processor is activated, the main processor 921 may receive a location information request signal or may transmit location information. When the communication processor is deactivated, the main processor 921 may not receive the location information request signal and may not transmit the location information.

According to an embodiment, the processor 920 may determine a state of the electronic device 901 based on location information, movement speed information, and/or remaining battery power information of the electronic device 901 and may transmit a message for changing a state of the electronic device 901 via the communication module 990. According to an embodiment, when the change of the electronic device 901 is changed, the processor 920 may transmit a parameter request message for an operation cycle of the communication processor.

Figure 10:
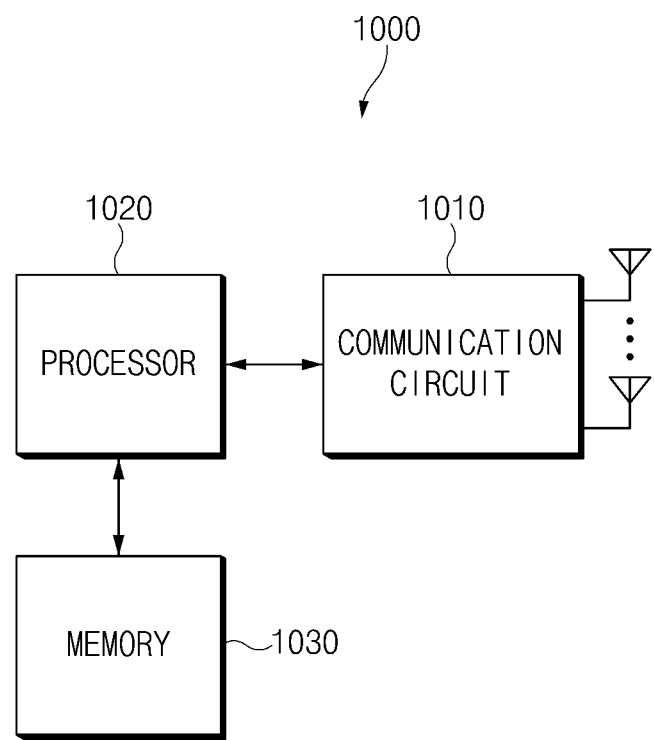
FIG. 10 is a block diagram illustrating a configuration of a server device according to an embodiment.

FIG. 10 is a block diagram illustrating a configuration of a server device according to an embodiment.

A server device 1000 shown in FIG. 10 may be, for example, an entity (e.g., an MME or a GW) included in the network 103 of FIG. 1 or may be the IoT platform 104 of FIG. 1. Referring to FIG. 10, the server device 1000 may include a communication circuit 1010, a processor 1020, and a memory 1030.

The communication circuit 1010 may provide an interface for communicating with other entities. The communication circuit 1010 may convert a bitstream transmitted to another entity into a physical signal or may convert a physical signal received from another entity into a bitstream. Furthermore, the communication circuit 1010 may transmit and receive a signal. Thus, the communication circuit 1010 may be referred to as a "transmitter," a "receiver," or a "transceiver."

The memory 1030 may store data such as an operating system program, an application program, or configuration information for an operation of the server device 1000. The memory 1030 may be configured as a volatile memory, a nonvolatile memory, or a combination thereof. The memory 1030 may provide data stored in the memory 1030 depending on a request of the processor 1020. According to an embodiment, the memory 1030 may store information about a state of the first electronic device 101 of FIG. 1. The memory 1030 may store location information, movement speed information, or remaining battery power information of the first electronic device 101.

The processor 1020 may control overall operations of the server device 1000. For example, the processor 1020 may transmit and receive a signal via the communication circuit 1010. According to an embodiment, the processor 1020 may transmit and receive a message for changing a state of the first electronic device 101 via the communication circuit 1010. According to an embodiment, the processor 1020 may store information about the state of the first electronic device 101 in the memory 1030. According to an embodiment, the processor 1020 may transmit and receive a message for changing an operation cycle of the first electronic device 101.

As described above, an electronic device (e.g., a first electronic device 101 of FIG. 1) may include a first communication circuit (e.g., a communication circuit included in a wireless communication module 992 of FIG. 9), a second communication circuit (e.g., another communication circuit included in the wireless communication circuit 992), a processor (e.g., a processor 920 of FIG. 9) configured to be electrically connected with the first communication circuit and the second communication circuit, and a memory (e.g., a memory 930 of FIG. 9) configured to be electrically connected with the processor. The memory may include instructions, when executed by the processor, cause the processor to obtain location information of the electronic device via the first communication circuit, transmit, based on the obtained location information, a first message for requesting to change a state of the electronic device to a network (e.g., a first network 103 of FIG. 1) via the second communication circuit, receive a first response message to the transmitted first message from the network, transmit a second message for requesting a parameter for an operation cycle of the second communication circuit to the network via the second communication circuit in response to the first response message, receive a second response message to the second message from the network, and change the operation cycle of the second communication circuit to a value corresponding to a current state of the electronic device in response to the second response message.

According to an embodiment, the parameter for the operation cycle may include at least one of a cycle where the second communication circuit is activated or deactivated and a time period when the electronic device monitors a location information request signal. Alternatively, the parameter for the operation cycle may further include at least one of a first timer value at which the electronic device operates in an idle mode and a second timer value at which the electronic device operates in a power saving mode (PSM).

According to an embodiment, the second message may include an attach request message, a TAU request message, or an RAU request message. The second response message may include an attach response message, a TAU response message, or an RAU response message.

According to an embodiment, the instructions may cause the processor to determine that the electronic device changes from a first state to a second state, based on at least one of the location information of the electronic device and information about a pre-specified area or information about a pre-specified movement path.

According to an embodiment, the instructions may cause the processor to determine that the electronic device is in one of a third state and a fourth state, based on at least one of movement speed information of the electronic device or remaining battery power information of the electronic device.

According to an embodiment, the instructions may cause the processor to determine that the electronic device is in the one of the third state and the fourth state, based on which of the movement speed information of the electronic device and the remaining battery power information of the electronic device takes priority. The first message may include information for requesting to change to one of the third state and the fourth state.

As described above, an electronic device (e.g., a first electronic device 101 of FIG. 1) may include a first communication circuit (e.g., a communication circuit included in a wireless communication module 992 of FIG. 9), a second communication circuit (e.g., another communication circuit included in the wireless communication module 992), a processor (e.g., a processor 920 of FIG. 9) configured to be electrically connected with the first communication circuit and the second communication circuit, and a memory (e.g., a memory 930 of FIG. 9) configured to be electrically connected with the processor. The memory may include instructions, when executed by the processor, cause the processor to obtain location information of the electronic device via the first communication circuit, determine, based on the obtained location information, that the electronic device changes from a first state to a second state, when the electronic device is in the second state, determine, based on at least one of movement speed information of the electronic device or remaining battery power information of the electronic device, that the electronic device is in one of a third state and a fourth state, transmit a first message for requesting to change a state of the electronic device to a network (e.g., a network 103 of FIG. 1) via the second communication circuit, receive a first response message to the transmitted first message from the network, transmit a second message for requesting a parameter for an operation cycle of the second communication circuit to the network via the second communication circuit in response to the first response message, receive a second response message to the second message from the network, and change the operation cycle of the second communication circuit to a value corresponding to a current state of the electronic device in response to the second response message.

According to an embodiment, the parameter for the operation cycle may include at least one of a cycle where the second communication circuit is activated and deactivated and a time period when the electronic device monitors a location information request signal. Alternatively, the parameter for the operation cycle may further include at least one of a first timer value at which the electronic device operates in an idle mode and a second timer value at which the electronic device operates in a power saving mode.

According to an embodiment, the second message may include an attach request message, a TAU request message, or an RAU request message. The second response message may include an attach response message, a TAU response message, or an RAU response message.

According to an embodiment, the instructions may cause the processor to determine that the electronic device changes from the first state to the second state, based on at least one of the location information of the electronic device and information about a pre-specified area or information about a pre-specified movement path.

According to an embodiment, the instructions may cause the processor to determine that the electronic device changes to one of the third state and the fourth state, based on priorities of the movement speed information of the electronic device and the remaining battery power information of the electronic device. The first message may include information for requesting to change to one of the third state and the fourth state.

As described above, a server device (e.g., a server device 1000 of FIG. 10 or an MME included in a network 103 of FIG. 1) in a wireless communication system may include a communication circuit (e.g., a communication circuit 1010 of FIG. 10) and a processor (e.g., a processor 1020 of FIG. 10). The processor may be configured to execute stored instructions to receive a first message for requesting to change a state of an electronic device (e.g., an electronic device 101 of FIG. 1) from another server device (e.g., an IoT platform 104 of FIG. 1), transmit a response message to the first message to the other server device, receive a second message for requesting a parameter for an operation cycle of the electronic device from the electronic device, determine a parameter for the operation cycle in response to the second message, and transmit a second response message including the determined parameter to the electronic device.

According to an embodiment, the second message may include an attach request message, a TAU request message, or an RAU request message. The second response message may include an attach response message, a TAU response message, or an RAU response message.

According to an embodiment, the second message may include the parameter for the operation cycle of the electronic device. The second response message may include the same parameter as the parameter included in the second message.

According to an embodiment, the parameter may include at least one of a cycle where the communication circuit is activated and deactivated and a time period when the electronic device monitors a location information request signal. Alternatively, the parameter may further include a first timer value at which the electronic device operates in an idle mode and a second timer value at which the electronic device operates in a power saving mode.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B," "at least one of A or/and B," "A, B, or C," or "one or more of A, B, or/and C," and the like used herein may include any and all combinations of one or more of the associated listed items. The expressions "a first," "a second," "the first," or "the second," used in herein, may refer to corresponding components without implying an order of importance, and are used merely to distinguish each component from the others without unduly limiting the components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic," "logical block," "part," and "circuit." The "module" may be an entirety of an integrated part or may be a part thereof. The "module" may be a unit for performing one or more functions or a part thereof. For example, the "module" may include an application-specific integrated circuit (ASIC).

Various embodiments of the present disclosure may be implemented by software (e.g., the program 940) including instruction(s) stored in a machine-readable storage media (e.g., an internal memory 936 or an external memory 938) readable by a machine (e.g., a computer). The machine may be a device that calls the instruction(s) from the machine-readable storage media and operates depending on the called instruction(s) and may include the electronic device (e.g., the electronic device 901). When the instruction(s) is executed by the processor (e.g., the processor 920), the processor may perform function(s) corresponding to the instruction(s) directly or using other components under the control of the processor. The instruction(s) may include code made by a compiler or code executable by an interpreter. The machine-readable storage media may be provided in the form of non-transitory storage media. Here, the term "non-transitory," as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device, comprising:
a first communication circuit;
a second communication circuit;
a processor configured to be electrically connected with the first communication circuit and the second communication circuit; and
a memory configured to be electrically connected with the processor, wherein the memory comprises instructions, when executed by the processor, cause the processor to:
operate the second communication circuit in a first state where an operation cycle of the second communication circuit is a first operation cycle,
while the second communication circuit is in the first state:
obtain location information of the electronic device via the first communication circuit;
identify an event of changing an operation state from the first state to a second state of the second communication circuit, based on the obtained location, by communicating with a network via the second communication circuit; and
in response to identifying the event of changing the operation state, operate the second communication circuit in the second state where the operation cycle of the second communication circuit is a second operation cycle higher than the first operation cycle,
determine that the operation state is in one of a third state and a fourth state, based on movement speed information of the electronic device, remaining battery power information of the electronic device, and which of the movement speed information of the electronic device or the remaining battery power information of the electronic device takes priority.

2. The electronic device of claim 1, wherein the instructions cause the processor to:
when identifying the event of changing the operation state:
transmit a first message for requesting to change the operation state of the electronic device to the network via the second communication circuit;
receive a first response message to the transmitted first message from the network; and
change the operation state of the second communication circuit to the second state.

3. The electronic device of claim 2, wherein the instructions cause the processor to:
when operating the second communication circuit in the second state:
transmit a second message for requesting a parameter for the operation cycle of the second communication circuit to the network via the second communication circuit in response to the first response message;
receive a second response message to the second message from the network; and
change the operation cycle of the second communication circuit to a value corresponding to the second operation cycle in response to the second response message.

4. The electronic device of claim 3, wherein the parameter for the operation cycle comprises at least one of a cycle where the second communication circuit is activated and deactivated and a time period when the electronic device monitors a location information request signal.

5. The electronic device of claim 4, wherein the parameter for the operation cycle further comprises at least one of a first timer value at which the electronic device operates in an idle mode and a second timer value at which the electronic device operates in a power saving mode (PSM).

6. The electronic device of claim 3, wherein the second message comprises an attach request message, a tracking area update (TAU) request message, or a routing area update (RAU) request message, and wherein the second response message comprises an attach response message, a TAU response message, or an RAU response message.

7. The electronic device of claim 1, wherein the instructions cause the processor to identify the event of changing the operation state, based on at least one of the location information of the electronic device and information about a pre-specified area or information about a pre-specified movement path.

8. The electronic device of claim 2, wherein the first message comprises information for requesting to change the operation state of the electronic device to one of the third state and the fourth state.

\* \* \* \* \*